Dec. 6, 1938.　　　　A. N. DAVEY　　　　2,139,301
AUTOMATIC CLUTCH AND VARIABLE TRANSMISSION GEAR
Filed Feb. 2, 1937

Inventor
Arthur N. Davey
By J. Irvine
Atty.

Patented Dec. 6, 1938

2,139,301

UNITED STATES PATENT OFFICE 2,139,301

AUTOMATIC CLUTCH AND VARIABLE TRANSMISSION GEAR

Arthur Nicholson Davey, Melbourne, Victoria, Australia

Application February 2, 1937, Serial No. 123,683
In Australia November 26, 1936

2 Claims. (Cl. 74—260)

The primary object of this invention is to provide a simple and efficient automatic clutch and variable speed transmission gear which will automatically take up the drive from a driving member and transmit it with infinitely variable speed ratio to a driven member in accordance with the load or resistance of the latter.

The gear is of the planetary type and rolling or planetary movement of the pinions is, under certain conditions, resisted by arranging for the centrifugal force developed by contained bodies of a fluid of relatively high specific gravity such as mercury to produce a variable braking effect upon rolling of the planet pinions. In this connection it has been already proposed for such bodies of fluid to be contained in drums that are fast with the planet pinions and that are provided internally with series of pocket-forming vanes, blades or like projections with the object of trapping and carrying portions of the fluid inwardly towards the main or common axis of rotation of the mechanism (as distinct from the axes of the planet pinions) against the centrifugal force developed about the main axis, and subsequently allowing such trapped portions to be flung outwardly by centrifugal force to repeat the cycle of operations. To effect such trapping and progressive displacement of the fluid, the internal vanes or projections have usually been of considerable length, and in most cases have been inclined from a true radial plane relative to the main axis. As a result, considerable proportions of the fluid in each drum are likely to be trapped in the pockets and carried so far inwardly towards the common axis that the centrifugal force acting about the respective planet pinion axis overcomes that acting about the common axis and prevents efficient operation of the mechanism.

Such disabilities are overcome by the present invention which provides that substantially the whole, or at least a very great preponderance, of the fluid in each drum will be maintained in the outward position, i. e. most distant from the common axis and that no substantial portion of the fluid will be carried so far inwardly as to result in the centrifugal force developed about the respective planet pinion axis to exceed that developed about the common axis.

In order to achieve this object, the internal projections of the fluid containing drums are according to the invention relatively short so as to resemble mere serrations or small teeth rather than vanes or blades of substantial length. Thus, a considerable number of such relatively short internal projections are at all times completely submerged in the fluid and will not function to displace any substantial proportion of the fluid towards the common axis of rotation. The braking action against planetary movement of the pinions does not, therefore, result from any substantial displacement of the fluid by the projections, but rather by the friction created by the internal projections tending to be forced through the main body of the fluid, which is maintained by centrifugal action about the common axis in that part of the drum most distant from the common axis.

One practical embodiment of the invention as designed for incorporation in an automobile will now be described, by way of example, with reference to the accompanying drawing in which—

Figure 1:
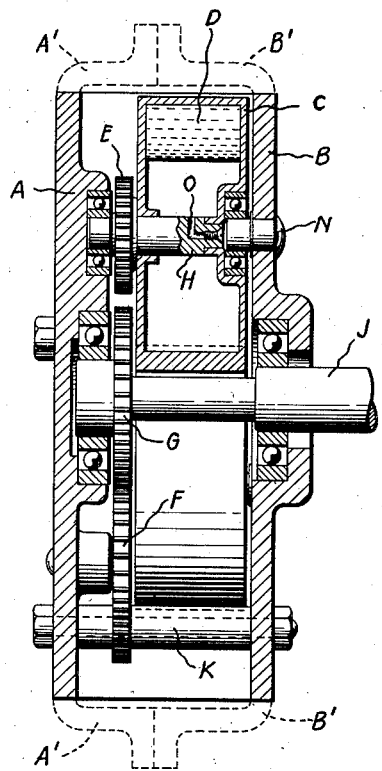
Figure 1 is a cross sectional view of the gear taken through the drums.
Figure 2:
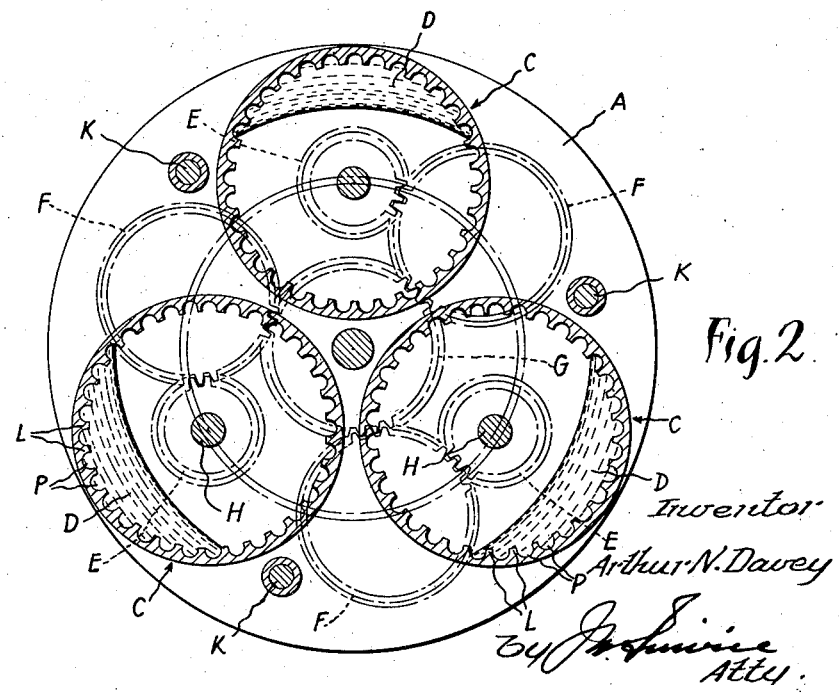
Figure 2 is a longitudinal section of the gear.

The planet pinion carrier may comprise two plates or discs A and B held in longitudinally spaced relationship by bolts K and associated spacing sleeves. The plates A and B may constitute or be connected to a fly wheel and the parts located between the plates may be enclosed by a suitable cover or the plates may have annular flanges $A_1$, $B_1$, bolted together so that the internal parts may operate in oil or grease.

Each drum C may be welded or otherwise made fast with a spindle H which at one end is supported by an anti-friction bearing in plate A, a planet pinion E being fast with the drum. Adjacent the other end of the spindle H, the drum has a flange encircling an anti-friction bearing disposed around a stud or pin N projecting inwardly from plate B. The planet pinions preferably mesh with idle pinions F which, in turn, mesh with a sun gear G fast on driven shaft J.

Each drum is charged with a suitable quantity of mercury or other suitable substance by way of a filler opening O which is closed by a screw plug after charging. Where mercury is employed as the fluid, the drum should preferably be evacuated or substantially evacuated of air. The material of which the drum is made should be, or be treated so as to be, impervious to the mercury and suitable precautions should be taken to make leakproof joints between the drum and spindle.

Each drum is provided around its inner periphery with a series of projections or teeth L which are of such relatively small length that a considerable number thereof will, at all times, be completely submerged in the main body of the mercury which, as indicated at D in the drawing, is maintained at that part of the drum most distant from the main axis. A corresponding number of the pockets P formed by and between the projections will, similarly, at all times be fully charged with the mercury, but as the pockets are of relatively shallow depth, a very small proportion, if any, of the mercury will be trapped in the pockets and carried inwardly towards the common axis.

Thus the braking action upon rolling or planetary movement of the pinions and the resultant variation in speed ratio between the driving and driven parts does not depend upon substantial displacement of the mercury but rather upon the friction or resistance created by the projectors L tending to be forced through the main body of mercury which is maintained in that part of the drum which is most distant from the main axis of rotation. The contained bodies of fluid thus tend to continuously oppose planetary movement of the pinions so that the speed of the driven member will be automatically and infinitely varied according to the load thereon and the speed of the driving member.

It should be understood that the number of planet pinions E, drums C and associated parts may vary and that various other modifications, refinements and/or additions may be incorporated without departing from the spirit and scope of the invention as defined by the appended claims.

Having now described my invention what I claim as new and desire to secure by Letters Patent is—

1. Variable speed power transmission mechanism of the planetary type wherein rolling or planetary movement of the planet pinions is resisted through medium of centrifugally influenced bodies of a fluid or free moving substance, such as mercury, contained in drums or the like which are fast with the respective planet pinions; characterized in that each drum is provided around its internal periphery with relatively small teeth a considerable number of which are at all times submerged in the fluid or like substance and produce a braking action upon the planet pinions by the friction or resistance created by the projections being forced through the main body of the fluid or like substance which is maintained by centrifugal action about the main or common axis in that part of the drum most distant from the common axis.

2. Variable speed power transmission mechanism, comprising driving and driven members, planet pinions carried by the driving member and operatively connected to the driven member, and drums or the like fast with the respective planet pinions and containing mercury or like fluid, the internal periphery of each drum being provided with relatively short projections, teeth or serrations forming relatively small, shallow, pockets between them, whereby during operation comparatively little, if any, of the mercury or the like will be trapped by the pockets and carried inwardly towards the common axis of rotation, and whereby planetary movement of the planet pinions will be continuously opposed by the friction or resistance created by said projections, teeth or serrations being forced through the main body of the mercury or like fluid while it is maintained by centrifugal action about the common axis in that part of the drum most distant from the common axis.

ARTHUR NICHOLSON DAVEY.